United States Patent
Mahmoud et al.

(10) Patent No.: US 11,425,163 B2
(45) Date of Patent: Aug. 23, 2022

(54) CONTROL OF CYBER PHYSICAL SYSTEMS SUBJECT TO CYBER AND PHYSICAL ATTACKS

(71) Applicant: King Fahd University of Petroleum and Minerals, Dhahran (SA)

(72) Inventors: Magdi Sadek Mostafa Mahmoud, Dhahran (SA); Mutaz M. Hamdan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 340 days.

(21) Appl. No.: 16/782,763

(22) Filed: Feb. 5, 2020

(65) Prior Publication Data

US 2021/0243224 A1    Aug. 5, 2021

(51) Int. Cl.
*H04L 9/40*  (2022.01)
*G06F 17/18*  (2006.01)

(52) U.S. Cl.
CPC .......... *H04L 63/1458* (2013.01); *G06F 17/18* (2013.01); *H04L 63/1416* (2013.01)

(58) Field of Classification Search
CPC ............. H04L 63/1458; H04L 63/1416; H04L 63/1466; G06F 17/18; G05B 19/0428
See application file for complete search history.

(56) References Cited

U.S. PATENT DOCUMENTS

| | | | |
|---|---|---|---|
| 2013/0030759 A1* | 1/2013 | Hao | G06F 17/18 702/179 |
| 2014/0044017 A1* | 2/2014 | Haltom | H04M 3/5166 379/207.02 |
| 2017/0060102 A1 | 3/2017 | Sargolzaei et al. | |
| 2020/0388275 A1* | 12/2020 | Kawai | G10L 15/20 |
| 2020/0404018 A1* | 12/2020 | Naserian | H04W 4/029 |
| 2021/0037044 A1* | 2/2021 | Achanta | H04L 63/1441 |
| 2021/0089661 A1* | 3/2021 | Rieger | G06F 11/3466 |

FOREIGN PATENT DOCUMENTS

| | | | | |
|---|---|---|---|---|
| CN | 108628163 A | 10/2018 | | |
| CN | 108628329 A | 10/2018 | | |
| CN | 108629132 A | * 10/2018 | ......... | G06F 17/5009 |
| CN | 108629132 A | 10/2018 | | |

OTHER PUBLICATIONS

Murguia, et al. ; On Reachable Sets of Hidden CPS Sensor Attacks ; Oct. 19, 2017 ; 7 Pages.
Chejerla, et al. ; Information fusion architecture for secure cyber physical systems ; Computers & Security, vol. 85 ; pp. 122-137 ; Aug. 2019 ; Abstract Only ; 2 Pages.

* cited by examiner

*Primary Examiner* — Meng Li
(74) *Attorney, Agent, or Firm* — Oblon, McClelland, Maier & Neustadt, L.L.P.

(57) ABSTRACT

Methods, systems, and computer readable media to control a cyber physical system using an observer-based controller are described.

10 Claims, 9 Drawing Sheets

CONTROL OF CYBER PHYSICAL SYSTEMS SUBJECT TO CYBER AND PHYSICAL ATTACKS

STATEMENT OF PRIOR DISCLOSURE BY AN INVENTOR

Aspects of the present disclosure appear in M. S. Mahmoud and M. Hamdan, "Improved control of cyber-physical systems subject to cyber and physical attacks," Cyber-Physical Systems, Volume 5, 2019—Issue 3, pp. 173-190 having a publication date of Jun. 24, 2019 and which is incorporated herein by reference in its entirety.

BACKGROUND

Technical Field

The present disclosure is directed generally to computer security, and, more particularly, to methods, computer readable media, and systems for improved control of cyber physical systems subject to cyber and physical attacks.

Background

Cyber Physical Systems (CPS) integrate aspects of communication, computation, and control aspects to achieve desired performance of physical systems. With a wide range of applications such as sustainable and blackout-free electricity generation and distribution, CPS has attracted the interest of researchers. (See, Rajkumar R, Lee I, Sha L, Stankovic J., *Cyber-physical systems: the next computing revolution*, Design Automation Conference (DAC), 2010 47th ACM/IEEE 2010 Jun. 13 (pp. 731-736). IEEE, which is incorporated herein by reference). Other applications for CPS include clean and energy-aware buildings and cities, smart medical and healthcare systems, transportation networks, chemical process control, smart grids, water/gas distribution networks, emergency management systems, etc. (See, Kim K D, Kumar P R. *An overview and some challenges in cyber-physical systems*, Journal of the Indian Institute of Science. 2013 Jul. 19; 93(3):341-52, which is incorporated herein by reference).

On the other hand, security issues increase the challenges of controlling CPS due to the fact that CPSs have a high possibility of being affected by several cyber attacks without providing any notification about failure. (See, D'Innocenzo A, Smarra F, Di Benedetto M D. *Resilient stabilization of multi-hop control networks subject to malicious attacks*, Automatica, 2016 Sep. 1; 71:1-9, which is incorporated herein by reference). These attacks can lead to a disruption to the physical system. For example, a disarrangement of coordination packets in medium access control layers or a compromise of the CPS networked components could be a result malware such as viruses and worms injected by an adversary. (See, Ding D, Han Q L, Xiang Y, Ge X, Zhang X M, *A survey on security control and attack detection for industrial cyber-physical systems*, Neurocomputing, 2018 Jan. 31; 275:1674-83, which is incorporated herein by reference). Moreover, in order to destroy normal systems operations, an attacker can illegally obtain access to supervision centers thereby obtaining an encryption key. That means, when there is a lack of security protection either in hardware or software strategies, the attacker has the capability to either arbitrarily disturb certain types of dynamics of the system or induce any perturbations therein. (See, Ding D, Han Q L, Xiang Y, Ge X, Zhang X M, *A survey on security control and attack detection for industrial cyber-physical systems*, Neurocomputing, 2018 Jan. 31; 275:1674-83, which is incorporated herein by reference). A well-known example is Stuxnet, which is a malicious computer worm that is used to target industrial controllers. Starting from USB sticks and local networks, it has been used to target prescribed controllers that were attached to an infected Windows box via Ethernet, Profibus, or a Siemens' proprietary communication link called MPI. (See, Langner R. Stuxnet: *Dissecting a cyberwarfare weapon*, IEEE Security & Privacy, 2011 May; 9(3):49-51, which is incorporated herein by reference). Communication among the items of a control system, i.e. sensors, actuators, and controllers, pass through heterogeneous forms of communications. For instance, programmable logic controllers (PLCs) can communicate over Modbus, Ethernet, and even Wi-Fi communication networks. Different vendors may also have proprietary protocols that are different for the same class of device.

A network may need to be secured to prohibit vulnerability to attack by adversaries during data transmission. Such attacks could lead to system instability or drive the system to perform undesired operations as mentioned above. Thus, consideration of security issues is a very important aspect when designing controllers for such a system.

CPS can be operated through IT infrastructures that permit timely data transmission among system components. However, the use of communication networks and heterogeneous IT components may make these CPS more vulnerable to cyber threats. (See, Teixeira A, Shames I, Sandberg H, Johansson K H, *A secure control framework for resource-limited adversaries*, Automatica, 2015 Jan. 1; 51:135-48, which is incorporated herein by reference). One example includes the industrial system and critical infrastructure used by Supervisory Control and Data Acquisition (SCADA) systems. The measurement and control data are commonly transmitted through unprotected communication channels in these systems, leaving the system vulnerable to several types of cyber attacks. (See, Giani A, Sastry S, Johansson K H, Sandberg H, *The VIKING project: an initiative on resilient control of power networks,* 2009 2nd International Symposium on Resilient Control Systems 2009 Aug. 11 (pp. 31-35), IEEE, which is incorporated herein by reference).

CPS could be affected by cyber and/or physical attacks. While the physical attack directly perturbs the dynamics of the systems, cyber attacks disturb CPS through the cyber-physical couplings. (See, Teixeira A, Shames I, Sandberg H, Johansson K H, *A secure control framework for resource-limited adversaries*, Automatica, 2015 Jan. 1; 51:135-48, which is incorporated herein by reference). Physical attacks include measurement corruption and attacks on the control architecture or the physical state itself (See, Pasqualetti F, Dorfler F, Bullo F, *Cyber-physical security via geometric control: Distributed monitoring and malicious attacks,* 2012 IEEE 51$^{st}$ IEEE Conference on Decision and Control (CDC) 2012 Dec. 10, pp. 3418-3425, IEEE, which is incorporated herein by reference). As an example: in an irrigation system, water was pumped out of the irrigation system in the experiments, while the water level measurements were corrupted so that the attack remained stealthy. (See, Pasqualetti F, Dorfler F, Bullo F, *Cyber-physical security via geometric control: Distributed monitoring and malicious attacks,* 2012 IEEE 51$^{st}$ IEEE Conference on Decision and Control (CDC) 2012 Dec. 10 (pp. 3418-3425), IEEE, which is incorporated herein by reference).

From a control security viewpoint, the two main types of cyber attacks are:

1) Denial of service (DoS) attack, which is a strategy that is often used for occupying the communication resources of a system in order to prohibit the transmission of measurement or control signals.

2) Deception attack, which is defined as the modification of the data integrity for the transmitted packets among some cyber parts in the CPS.

While some published studies do not differentiate between deception attacks and false data injection (FDI) attacks, most studies differentiate between these types of attacks and consider FDI as a class of deception attacks. (See, Teixeira A, Shames I, Sandberg H, Johansson K H, *A secure control framework for resource-limited adversaries*, Automatica, 2015 Jan. 1; 51:135-48; Mo Y, Garone E, Casavola A, Sinopoli B, *False data injection attacks against state estimation in wireless sensor networks*, 49th IEEE Conference on Decision and Control (CDC) 2010 Dec. 15 (pp. 5967-5972), IEEE; Pang Z H, Liu G P, Zhou D, Hou F, Sun D, *Two-channel false data injection attacks against output tracking control of networked systems*, IEEE Transactions on Industrial Electronics, 2016 May; 63(5):3242-51; and Deng R, Xiao G, Lu R, Liang H, Vasilakos A V, *False data injection on state estimation in power systems—Attacks, impacts, and defense: A survey*, IEEE Transactions on Industrial Informatics, 2017 April; 13(2):411-23, which are incorporated herein by reference). Moreover, FDI attacks are not limited to "the modification of data integrity for the transmitted packets among some cyber parts". A man-in-the-middle attack (MITM) can occur by modifying the software running on the devices themselves, i.e., the software may be compromised while the packet transmission is fine.

Control of a CPS under cyber attack is one of the main issues in control engineering and therefore has attracted a lot of research. Some studies consider DoS attacks and deception attacks separately. (See, Dolk V S, Tesi P, De Persis C, Heemels W P, *Output-based event triggered control systems under denial-of-service attacks*, Decision and Control (CDC), 2015 IEEE 54th Annual Conference on 2015 Dec. 15 (pp. 4824-4829), IEEE; Dolk V S, Tesi P, De Persis C, Heemels W P, Event-triggered control systems under denial-of-service attacks. IEEE Transactions on Control of Network Systems. 2017 March; 4(1):93-105; Foroush H S, Martinez S, *On event-triggered control of linear systems under periodic denial-of-service jamming attacks*, Decision and Control (CDC), 2012 IEEE 51st Annual Conference on 2012 Dec. 10 (pp. 2551-2556), IEEE; De Persis C, Tesi P, *Resilient control under denial-of-service*, IFAC Proceedings Volumes, 2014 Jan. 1; 47(3):134-9; De Persis C, Tesi P, *On resilient control of nonlinear systems under denial-of-service*, Decision and Control (CDC), 2014 IEEE 53rd Annual Conference on 2014 Dec. 15 (pp. 5254-5259). IEEE, Ma L, Wang Z, Yuan Y, *Consensus control for nonlinear multi-agent systems subject to deception attacks*, Automation and Computing (ICAC), 2016 22nd International Conference on 2016 Sep. 7 (pp. 21-26), IEEE; Huang X, Dong J, *Adaptive optimization deception attack on remote state estimator of aero-engine*, Control And Decision Conference (CCDC), 2017 29th Chinese 2017 May 28 (pp. 5849-5854). IEEE; Bai C Z, Pasqualetti F, Gupta V, *Data-injection attacks in stochastic control systems: Detectability and performance tradeoffs*, Automatica, 2017 Aug. 31; 82:251-60; and Ding D, Wei G, Zhang S, Liu Y, Alsaadi F E, *On scheduling of deception attacks for discrete-time networked systems equipped with attack detectors*, Neurocomputing, 2017 Jan. 5; 219:99-106, which are incorporated herein by reference).

Other studies have considered two kinds of attacks, such as randomly occurring DoS and deception attacks, in designing an event-based security control system. The optimal control problem has been investigated for a class of NCSs subject to DoS, deception, and physical attacks using a delta operator approach and by applying $\epsilon$-Nash equilibrium. (See, Yuan Y, Zhang P, Guo L, Yang H, *Towards quantifying the impact of randomly occurred attacks on a class of networked control systems*, Journal of the Franklin Institute, 2017 Aug. 1; 354(12):4966-88, which is incorporated herein by reference). A resilient linear quadratic Gaussian control strategy for networked control systems (NCSs) subject to zero dynamic attacks was designed. (See, Rhouma T, Chabir K, Abdelkrim M N, *Resilient control for networked control systems subject to cyber/physical attacks*, International Journal of Automation and Computing, 2018; 15, (3):345-354, which is incorporated herein by reference). Dynamic programming was applied for the control strategy and value iteration methods was applied for the design of power transmission strategy for a class of CPS subject to DoS attack. (See, Yuan H, Xia Y, *Resilient strategy design for cyber-physical system under DoS attack over a multi-channel framework*, Information Sciences, 2018 Jul. 1; 454:312-27, which is incorporated herein by reference). An H1 observer-based periodic event-triggered control (PETC) framework was used for designing a resilient control strategy for CPS subject to DoS attacks. (See, Sun Y C, Yang G H, *Periodic event-triggered resilient control for cyber physical systems under denial-of-service attacks*, Journal of the Franklin Institute, 2018 Sep. 1; 355(13):5613-31, which is incorporated herein by reference). In one study, an H1 minimax controller was applied in the physical layer by using a delta operator approach to solve a resilient control problem for wireless networked control system subject to DoS attack via a hierarchical game approach. (See, Yuan H, Xia Y, Yang H, Yuan Y, *Resilient control for wireless networked control systems under DoS attack via a hierarchical game*, International Journal of Robust and Nonlinear Control, 2018 Oct. 1; 28(15):4604-23, which is incorporated herein by reference).

The major drawbacks of the aforementioned methods relate to the consideration of only the probability of the random occurrences of the attacks to be constant, which does not fully cover the common practical behavior of attacks. Other methods have proposed including a state feedback controller, which means the availability of full information about the states, but this is not the case in most of the practical systems. (See, Yuan Y, Zhang P, Guo L, Yang H, *Towards quantifying the impact of randomly occurred attacks on a class of networked control systems*, Journal of the Franklin Institute, 2017 Aug. 1; 354(12):4966-88, which is incorporated herein by reference).

Some implementations of the present disclosure were conceived in light of the above-mentioned problems and limitations.

SUMMARY

Some implementations can provide a secure control system in the presence of:

1) randomly occurring physical and cyber attacks;

2) occurrence of physical and cyber (DoS and deception) attacks (e.g., modeled as Bernoulli distributed white sequences with variable conditional probabilities); and/or 3) partial knowledge of the states using an observer system to estimate the unknown outputs.

Some implementations can include an observer-based controller to securely control a cyber physical system, the observer-based controller including: a detector to determine an occurrence of an attack on the cyber physical system and to inform the observer-based controller via a signal; and an observer to estimate a system state of the cyber physical system based on at least partial information about the cyber physical system. In some implementations, the observer-based controller can be configured to adjust an observer gain and a controller gain upon receiving the signal from the detector indicating the attack, and the observer-based controller is configured to control the cyber physical system such that a physical attack signal is secured to be within a first threshold, a deception attack signal is secured to be within a second threshold, and an error of the estimated system state is secured to be within a third threshold.

In some implementations, the observer estimates one or more next system states based on one or more current system states, a current control signal and the error of the estimated system state of the cyber physical system. In some implementations, the observer gain and the controller gain are determined based on the first threshold, the second threshold and the third threshold.

In some implementations, the first threshold, the second threshold and the third threshold are received as input from a user. In some implementations, the cyber physical system includes a communication network connecting the observer-based controller and one or more actuators. In some implementations, the first threshold, the second threshold and the third threshold are received as input from another system.

In some implementations, the attack includes a physical attack affecting the cyber physical system. In some implementations, the attack includes one of a denial of service attack or a deception attack occurring in the communication network between the observer-based controller and the one or more actuators.

In some implementations, the denial of service attack is represented as a probability distribution. In some implementations, the cyber physical system is a fluid transfer system, wherein the physical attack includes perturbing measurements of one or more fluid levels in the fluid transfer system, wherein the denial of service attack includes blocking arrival of one or more control signals to corresponding fluid actuators, wherein the deception attack includes modifying one or more control signals controlling the corresponding fluid actuators, and wherein the controller adjusts the observer gain and the controller gain to respective values determined based on the first, second and third thresholds upon detection of the attack.

In some implementations, the communication network is a wireless communication network having a relay node, wherein the denial of service attack and the deception attack are performed through the relay node, and wherein the detector is configured to detect a missing or modified control signal at the relay node.

Some implementations can include a method to control a cyber physical system. The method can include detecting, via a detector, an occurrence of an attack on the cyber physical system and informing an observer-based controller of the attack via a signal from the detector. The method can also include estimating, using an observer, a system state of the cyber physical system based on at least partial information about the cyber physical system, and adjusting, using the observer-based controller, an observer gain and a controller gain upon receiving the signal from the detector indicating the attack. The method can further include controlling, using the observer-based controller, the cyber physical system such that a physical attack signal is secured to be within a first threshold, a deception attack signal is secured to be within a second threshold, and an error of the estimated system state is secured to be within a third threshold.

The method can also include estimating, using the observer, one or more next system states based on one or more of current system states, a current control signal and the error of the estimated system state of the cyber physical system. In some implementations, the observer gain and the controller gain are determined based on the first threshold, the second threshold and the third threshold.

The method can further include receiving the first threshold, the second threshold and the third threshold as input from a user. In some implementations, the cyber physical system is a fluid transfer system, wherein detecting the occurrence of the attack includes detecting a physical attack, a denial of service attack, or a deception attack, wherein the physical attack includes perturbing measurements of one or more fluid levels in the fluid transfer system, wherein the denial of service attack includes blocking arrival of one or more control signals to corresponding fluid actuators, wherein the deception attack includes modifying one or more control signals controlling the corresponding fluid actuators, and wherein the observer-based controller adjusts the observer gain and the controller gain to respective values determined based on the first, second and third thresholds upon detection of the attack.

Some implementations can include a non-transitory computer readable medium having instructions stored therein that, when executed by one or more processors, cause the one or more processors to perform a method to control a cyber physical system using an observer-based controller. The method can include detecting, via a detector, an occurrence of an attack on the cyber physical system and informing an observer-based controller of the attack via a signal from the detector. The method can also include estimating, using an observer, a system state of the cyber physical system based on at least partial information about the cyber physical system, and adjusting, using the observer-based controller, an observer gain and a controller gain upon receiving the signal from the detector indicating the attack. The method can further include controlling, using the observer-based controller, the cyber physical system such that a physical attack signal is secured to be within a first threshold, a deception attack signal is secured to be within a second threshold, and an error of the estimated system state is secured to be within a third threshold.

The method can also include estimating, using the observer, one or more next system states based on one or more of current system states, a current control signal and the error of the estimated system state of the cyber physical system. In some implementations, the observer gain and the controller gain are determined based on the first threshold, the second threshold and the third threshold.

The method can further include receiving the first threshold, the second threshold and the third threshold as input from a user. In some implementations, the cyber physical system is a fluid transfer system, wherein detecting the occurrence of the attack includes detecting a physical attack, a denial of service attack, or a deception attack, wherein the physical attack includes perturbing measurements of one or more fluid levels in the fluid transfer system, wherein the denial of service attack includes blocking arrival of one or more control signals to corresponding fluid actuators, wherein the deception attack includes modifying one or more control signals controlling the corresponding fluid actuators, and wherein the observer-based controller adjusts the observer gain and the controller gain to respective values determined based on the first, second and third thresholds upon detection of the attack.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
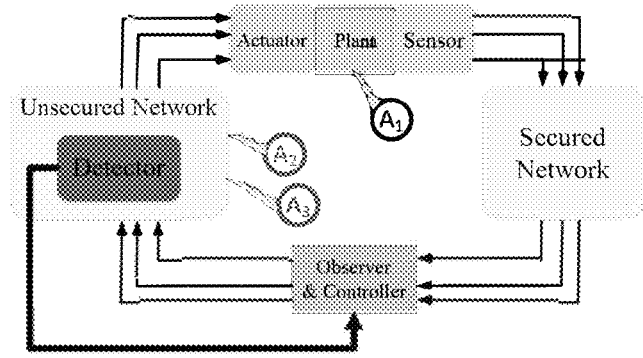
FIG. 1 is a diagram of an example cyber physical system in accordance with some implementations.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Cyber Physical Systems (CPS) can be defined as integrations of computation, communication, and control components in order to achieve the desired performance of physical processes. Security threats can affect CPSs by several types of cyber attack without providing any indication of the cause of failure. One important problem, especially in power systems, is controlling a CPS that is under cyber attack.

Some implementations can include a secure observer-based controller for discrete time CPS subject to both cyber (DoS and deception) and physical attacks. To test the disclosed controller, occurrences of cyber and physical attacks were modeled as Bernoulli distributed white sequences with variable conditional probabilities. As discussed in detail below, a sufficient condition was first derived under which the observer-based control system is guaranteed to have the desired security level using a stochastic analysis technique. Then, the observer gain and controller gain were designed by solving a linear matrix inequality (e.g., using YALMIP and MATLAB). Numerical results from a simulated CPS under simulated attack are shown to demonstrate the effectiveness of the disclosed control system.

In some implementations, a cyber physical system (CPS) can include one or more actuators, a physical plant, one or more sensors, and an observer-based controller. A communication network can be used to connect the controller and the one or more actuators as shown in FIG. 1.

Actuators can include linear actuators, rotary actuators, electronically controlled valves, relays, etc. Sensors can include sensors generating one or more signals based on a measured temperature, pressure, actuator state, pH, weight, flow rate, or other attribute. The observer-based controller can include a programmable logic controller or other suitable device. The physical plant can include a mechanical plant or industrial plant, a manufacturing plant, or other facility and the associated infrastructure used in operation and maintenance of the plant or facility. An example CPS could be affected by both physical and cyber attacks.

Next, the equations below set forth an exemplary algorithmic process for performing observer-based control according to one aspect of the present disclosure. The hardware description below, exemplified by any one of the structure examples shown in FIG. 8 or 9, can include specialized corresponding structure that is programmed or configured to perform the observer-based control process described herein. For example, the observer-based control process may be completely or partially performed by the circuitry included in the single device shown in FIG. 8, or the algorithm may be completely or partially performed in a shared manner distributed over the circuitry of any plurality of the devices shown in FIG. 9.

CPS System Model

A physical attack affecting the plant is represented by (A1) in FIG. 1. For the system model, some assumptions are made.

Assumption 1: A reliable network (e.g., a secure network) is used for data transmission between the sensors and the controller while the channel used for communication between the controller and the actuators is unreliable (or unsecure), and could be affected by cyber attacks which can include attacks such as a denial of service (DoS) attack or a deception attack, labeled as (A2) and (A3), respectively, in FIG. 1. (See, Yuan Y, Zhang P, Guo L, Yang H, Towards quantifying the impact of randomly occurred attacks on a class of networked control systems, Journal of the Franklin Institute, 2017 Aug. 1; 354(12):4966-88; Xin, K., Cao, X., Chen, J., Cheng, P. and Xie, L., *Optimal controller location in wireless networked control systems*, International Journal of Robust and Nonlinear Control, 25(2), pp. 301-319; and Zhang, H., Cheng, P., Shi, L. and Chen, J., *Optimal DoS attack scheduling in wireless networked control system*, IEEE Transactions on Control Systems Technology, 24(3), pp. 843-852, which are incorporated herein by reference).

Assumption 2: The observer and controller are located in a secure place in the supervisory control center.

Remark 1: As shown in FIG. 1, a detector is used to determine the occurrence of the attack and then informs the controller when it happened. Once the controller has received this signal from the detector, the gains of the observer and controller are changed to assure the stability of the system as discussed below. Analysis of the controller is focused on the post-attack period and the observer and controller gains are configured to work when the attack occurs.

The example plant can be described by the following formula:

$$x(k+1) = Ax(k) + Bu_p(k) + \eta(k)f(k)$$
$$y(k) = Cx(k) \quad (1)$$

where $x(k) \in \mathbb{R}^{n_x}$, $u_p(k) \in \mathbb{R}^{n_u}$, $y_p(k) \in \mathbb{R}^{n_y}$, and $f(k) \in \mathbb{R}^{n_f}$ are the system state, the control signals received by the actuators, the system output and physical attack signal injected by the attackers, respectively. A, B and C are known matrices with proper dimensions and B is partitioned as $$B = [B_1 \, B_2 \ldots B_r] \quad (2)$$

Also, control input received by the actuator up(k) is partitioned as $$u_p(k) = \Gamma(k)[u_1^T \, u_2^T \ldots u_r^T]^T \quad (3)$$

where $\Gamma(k)$ describes the occurrence of the DoS attack as:

$$\Gamma(k) = \{\beta_1 \, \beta_2 \ldots \beta_r\} \quad (4)$$

with indicator $\beta_i(k)$, $i \in R := \{1 \cdot r\}$ being the Bernoulli distributed white sequence. The physical attack is considered to be source limited and satisfies $\|f(k)\|^2 < \delta_1^2$, where $\delta_1$ is a known constant.

When the full state information is not available, it is desirable to design the following observer-based controller:

Observer:

$$\hat{x}(k+1) = A\hat{x}(k) + Bu_c(k) + L(y(k) - \hat{y}(k))$$
$$\hat{y}(k) = C\hat{x}(k) \quad (5)$$

Controller:

$$u_c(k) = K\hat{x}(k) \quad (6)$$

where $\hat{x}(k) \in \mathbb{R}^{n_x}$ is the estimate of the system states (1), $\hat{y}(k) \in \mathbb{R}^{n_y}$ is the observer output, and $L \in \mathbb{R}^{n_x \times n_y}$ and $K \in \mathbb{R}^{n_u \times n_x}$ are the observer and controller gains, respectively.

Assumption 3: The control signal $u_c(k)$ could be affected by both DoS attacks and deception attacks, so it will be received by the actuator as:

$$u_{p_i}(k) = K_i\hat{x}(k) + \alpha_i(k)\zeta_i(k) \quad (7)$$

where $\zeta_i(k)$ is the deception attack signal affecting actuator I and $\|\zeta(k)\zeta^2 < \delta_2^2$ and $\delta_2$ is a known constant. The indicator $\alpha_i(k)$ is a Bernoulli distributed white sequence.

The estimation error is defined by $e(k) = x(k) - \hat{x}(k)$, and the closed loop system and estimation error can be formulated using equations (2)-(7) as follows:

$$x(k+1) = Ax(k) + \sum_{i=1}^{r} \beta_i(k)B_iK_ix(k) - \sum_{i=1}^{r} \beta_i(k)B_iK_ie(k) + \sum_{i=1}^{r} \beta_i(k)a_i(k)B_i\zeta_i(k) + \eta(k)f(k) \quad (8)$$

$$e(k+1) = (A - LC)e(k) + \sum_{i=1}^{r}(1 - \beta_i(k))B_iK_ie(k) - \sum_{i=1}^{r}(1 - \beta_i(k))B_iK_ix(k) + \sum_{i=1}^{r}(\beta_i(k)a_i(k)B_i\zeta_i(k) + \eta(k)f(k) \quad (9)$$

Example Threat Model

Simultaneous occurrence of DoS and deception attacks is unlikely. Also, the DoS attack is assumed to cause signal loss, which means that the signal is either lost because of the DoS attack or manipulated because of the deception attack, which can be ignored for certain purposes as noted in equations (8) and (9). (See, Ding D, Han Q L, Xiang Y, Ge X, Zhang X M, *A survey on security control and attack detection for industrial cyber-physical systems*, Neurocomputing, 2018 Jan. 31; 275:1674-83, which is incorporated herein by reference).

It can be assumed that both types of attacks could occur during an attack period and this scenario is discussed in the illustrative example below.

Assumption 4: The indicators $\eta(k)$, $\alpha_i(k)$ and $\beta_i(k)$, $i \in \mathbb{R}$ are uncorrelated with each other and with stochastic properties as listed in FIG. 2.

Remark 2: As noted, the attacks can affect the CPS randomly since (a) the cyber environment of CPS is complicated and fluctuates in a random way, and (b) the successes of attacks are largely determined by security facilities and has a random property. (See, Ding D, Wang Z, Wei G, Alsaadi F E, *Event-based security control for discrete-time stochastic systems*, IET Control Theory & Applications, 2016 Jun. 13; 10(15):1808-15, which is incorporated herein by reference). So, it is more practical to consider the security problem of CPS affected by various types of stochastic attacks.

Remark 3: Assuming that the attackers are energy-bounded is reasonable in engineering practice. So, it is valid to assume that the physical and deception attacks are both norm bounded. (See, Yuan, Y. and Sun, F., *Data fusion-based resilient control system under DoS attacks: a game theoretic approach*, International Journal of Control, Automation and Systems, 13(3), pp. 513-520, 2015, which is incorporated herein by reference).

In terms of $\xi(k) = [x^T(k) \, e^T(k)]^T$; system (8) and (9) can be cast into the form:

$$\xi(k+1) = \overline{A}\xi(k) + \overline{B}\xi(k) + \overline{C}f(k) \quad (10)$$

where $\xi(k) = [\xi_1(k), \xi_2(k) \, l \cdot \not{p}r(k)]^T$, and $$\overline{A} = \begin{bmatrix} A + \sum_{i=1}^{r}(\beta_i(k)B_iK_i & -\sum_{i=1}^{r}\frac{\beta_i(k)B_iK_i}{\overline{A}_{22}} \\ -\sum_{i=1}^{r}(1 - \beta_i(k))B_iK_i & \end{bmatrix} \quad (11)$$

$$\overline{A}_{22} = A - LC + B_iK_i$$

$$\overline{B} = \begin{bmatrix} \overline{B}_1 & \overline{B}_2 & \cdots & \overline{B}_r \\ \overline{B}_1 & \overline{B}_2 & \cdots & \overline{B}_r \end{bmatrix}$$

$$\overline{B}_i = \beta_i(k)\alpha_i(k)B_i, \, i = 1, \ldots, r$$

$$\overline{C} = [\eta(k)I \quad \eta(k)I]^T$$

Remark 4: As noted from (8), there are three scenarios of the cyber attacks on each channel i: 1) DoS attack, when $\beta i(k) = 0$ and regardless the value of $\alpha i(k)$, 2) Deception attack, when $\beta i(k) = 1$ and $\alpha i(k) = 1$, and 3) No cyber attack, when $\beta i(k) = 1$ and $\alpha i(k) = 0$.

Figure 2:
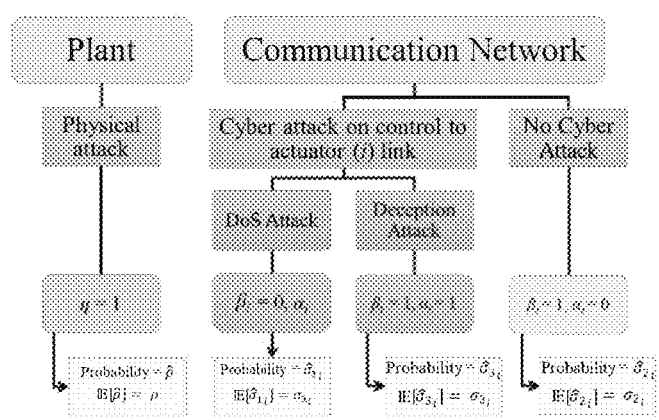
FIG. 2 is a diagram of example control thresholds and attacks on a physical plant and communication network of a cyber physical system in accordance with some implementations.

These scenarios in addition to the physical attack are summarized in FIG. 2

Definition 1: Given the positive constant scalars $\delta_1$, $\delta_2$, $\delta_3$. The observer-based controller (5) and (6) is said to be $\delta_1$, $\delta_2$, $\delta_3$ secure if, when $\mathbb{E}\|f(k)\|^2 < \delta_1^2$, $\|\xi(k)\|^2 \leq \delta_2^2$, then $\mathbb{E}\|e(k)\|^2 \leq \delta_3^2$ for all k.

Experimental Results

The observer-based controller with functionality as described in equations (5) and (6) guarantees that system (1) is δ1, δ2, δ3 secure. A stability analysis and observer-based design for any CPS in the configuration shown in FIG. 1 including a plant in the form of (1) is described below. First, a sufficient condition under which the observer-based controller (5) and (6) is δ1, δ2, δ3 secure in the presence of stochastic DoS, deception, and physical attacks is derived. Next, the designed method of the desired observer-based controller is provided using the obtained conditions.

Theorem 1: Given the positive scalars δ1, δ2, δ3 and the control and estimator gains (K1; K2; ...; Kr) and L. The observer-based controller (5) and (6) is δ1, δ2 secure if there exist positive definite matrices P and positive scalars ε1 and ε2 satisfying the following inequalities:

$$\begin{cases} \hat{\Omega} \leq 0 \\ \dfrac{\phi^2 s_0^2}{\lambda_{min}(p)(s_0-1)} \leq \delta_3^2 \end{cases} \quad (12)$$

where:

$$\hat{\Omega} = \begin{bmatrix} \overline{A}^T P \overline{A} & \overline{A}^T P \overline{B} & \overline{A}^T P \overline{C} \\ * & \overline{B}^T P \overline{B} - \varepsilon_2 I & \overline{B}^T P \overline{C} \\ * & * & \overline{C}^T P \overline{C} - \varepsilon_1 I \end{bmatrix} \quad (13)$$

where $\phi^2 = \varepsilon_1 \delta_1 + \varepsilon_2 \delta_2$ and $\overline{A}, \overline{B}, \overline{C}$ are defined in (11)

Proof 1: To establish the main theorem, the following Lyapunov function is constructed $$v(k) = x^T(k) P x(k) \quad (14)$$

Evaluating the difference of V(k), we have $$\mathbb{E}_{[\Delta V(k)]} = \mathbb{E}_{[V(k+1)-V(k)]} < \mathbb{E}_{[\xi^T(k)\overline{A}^T P} \\ \overline{A}\xi(k) + 2\xi^T(k)\overline{A}^T P \overline{B} \zeta(k) 2\xi^T(k)\overline{A}^T P \overline{C} f(k) + (k) + \zeta^T(k) \\ \overline{B}^T P \overline{B} \zeta(k) 2\zeta^T(k) \overline{B}^T P \overline{C} f(k) + f^T(k) \overline{C}^T P \\ \overline{C} f(k) - \zeta^T(k) P \xi(k) + \varepsilon_1(\delta_1 - f^T(k) f(k)) + \varepsilon_2(\delta_2 - \zeta^T(k)\zeta(k))] \quad (15)$$

So, it could be rewritten as:

$$\mathbb{E}_{[\Delta V(k)]} \leq \mathbb{E}_{[\Xi^T(k)\hat{\Omega}\Xi(k) + \phi^2]} \quad (16)$$

where $$\Xi^T(k) = [\xi(k) \zeta(k) f(k)] \quad (17)$$

From (16), it is known that:

$$\mathbb{E}_{[\Delta V(k)]} \leq -\lambda_{min}(-\overline{\Omega}) \mathbb{E}_{[\|\xi(k)\|^2]} + \phi^2 \quad (18)$$

Also, by referring to the definition of the energy-like functional V(k), it is seen that $$V(k) \leq \lambda_{max}(P) \mathbb{E}_{[\|\xi(k)\|^2]} \quad (19)$$

Also, a scalar s>1 is introduced, and from (18) and (19) it follows that $$\mathbb{E}_{[s^{k+1}V(k+1)]} - \mathbb{E}_{[s^k V(k)]} = s^{k+1} \mathbb{E}_{[\Delta V(k)]} + s^{k+1} \mathbb{E}_{[V} \\ (k)] - s^k \mathbb{E}_{E[V(k)]} \leq s^{k+1} [-\lambda_{min}(-\hat{\Omega}) \mathbb{E}_{[\|\xi(k)\|^2]} + \\ \phi^2] + s^k(s-1) \mathbb{E}_{[V(k)]} \leq a(s) s^k \mathbb{E}_{[\|\xi(k)\|^2]} + s^{k+1}\phi^2 \quad (20)$$

where $a(s) = -\lambda_{min}(-\hat{\Omega})s + (s-1)\lambda_{max}(P)$.

For any integer T, summing up both sides of (20) from 0 to T−1 with respect to k yields:

$$\mathbb{E}[s^T V(T)] - \mathbb{E}[V(0)] \quad (21)$$

$$\leq a(s) \mathbb{E}[\|\xi(k)\|^2] + \frac{s(1-s^T)}{1-s} \phi^2$$

Since $a(1) = -\lambda_{min}(-\hat{\Omega}) < 0$ and $\lim_{s \to \infty} = +\infty$, there exists a scalar $s_0 > 1$ such that $a(s_0) = 0$. So, a scalar $s_0 > 1$ could be found such that:

$$\mathbb{E}[s_0^T V(T)] - \mathbb{E}[V(0)] \leq \frac{s_0(1-s_0^T)}{1-s_0} \phi^2 \quad (22)$$

Noting that:

$$\mathbb{E}[s_0^T V(T)] \begin{matrix} \geq \lambda_{min}(P) s_0^T \mathbb{E}[\|\xi(T)\|^2] \\ \geq \lambda_{min}(P) s_0^T \mathbb{E}[\|e(T)\|^2] \end{matrix} \quad (23)$$

We have:

$$E[\|e(T)\|^2] \leq \frac{(s_0^T - 1)\phi^2}{s_0^{T-1}(s_0-1)\lambda_{min}(P)} \quad (24)$$

Referring to (15), it can be shown that $E\|e(T)\|^2 \leq \delta 22$, which, from Definition 1, implies that the estimation error system (10) is δ1, δ2, δ3 secure, and so, the proof of Theorem 1 is complete.

Theorem 2: Given the positive scalars δ1, δ2, δ3, a positive definite matrix P and positive scalars ε1 and ε2. The observer-based controller (5) and (6) is δ1, δ2, δ3 secure if there exist controller and estimator gains (K1, K2, ..., Kr) and L satisfying the following inequalities:

$$\Omega \leq 0 \quad (25)$$

$$\frac{\phi^2 s_0^2}{\lambda_{min}(P)(s_0-1)} \leq \delta_3^2$$

where:

$$\begin{bmatrix} \Omega_{11} & \Omega_{12} \\ * & -\hat{X} \end{bmatrix} \quad (26)$$

with

-continued $$\Omega_{11} = \begin{bmatrix} -\overline{X} & 0 & 0 \\ * & -\varepsilon_2 I & 0 \\ * & * & -\varepsilon_1 I \end{bmatrix}, \Omega_{12} = \begin{bmatrix} \Psi \\ \overline{B}^T \\ \overline{C}^T \end{bmatrix} \quad (27)$$

where:

$$\Psi = \begin{bmatrix} \Psi_1 & \Psi_2 \\ \Psi_3 & \Psi_4 \end{bmatrix}$$

$$\Psi_1 = XA^T + \sum_{i=1}^{r} \beta_i(k) Y_i^T B_i^T$$

$$\Psi_2 = -\sum_{i=1}^{r} (1 - \beta_i(k)) Y_i^T B_i^T$$

$$\Psi_3 = XA^T + \sum_{i=1}^{r} \beta_i(k) Y_i^T B_i^T$$

$$\Psi_4 = XA^T - Z^T + \sum_{i=1}^{r} (1 - \beta_i(k)) Y_i^T B_i^T$$

and $$K_i = Y_i X^{-1},$$

$i = 1, \ldots, r,$ and $$L = ZX^{-1}C'$$

Proof 2: $\hat{\Omega}$ in equation (12) can be written as:

$$\hat{\Omega} = \hat{\Omega}_{11} + \hat{\Omega}_{12} \hat{\Omega}_{22} \hat{\Omega}_{12}^T \quad (28)$$

with $$\hat{\Omega}_{11} = \begin{bmatrix} -P & 0 & 0 \\ * & -\varepsilon_2 I & 0 \\ * & * & -\varepsilon_1 I \end{bmatrix}, \hat{\Omega}_{12} = \begin{bmatrix} A^T \\ \overline{B}^T \\ \overline{C}^T \end{bmatrix} \quad (29)$$

$$\hat{\Omega}_{22} = P$$

So, equation (12) is formulated using Schur complements as:

$$\begin{bmatrix} \hat{\Omega}_{11} & \hat{\Omega}_{12} \\ * & \hat{\Omega}_{22}^{-1} \end{bmatrix} \quad (30)$$

Now, define $\overline{X} = P^{-1}$, then multiply Eq. (30) from right and left by diag$\{\overline{X}, I, I, I\}$ and by selecting:

$$X = \begin{bmatrix} X & 0 \\ 0 & X \end{bmatrix}, \quad \text{Eq. (26)}$$

$$Y_i^T = XK_i^T, i = 1, \ldots, r,$$

$$Z^T = XC^T L^T$$

can be obtained.

Example Implementation

Figure 3:
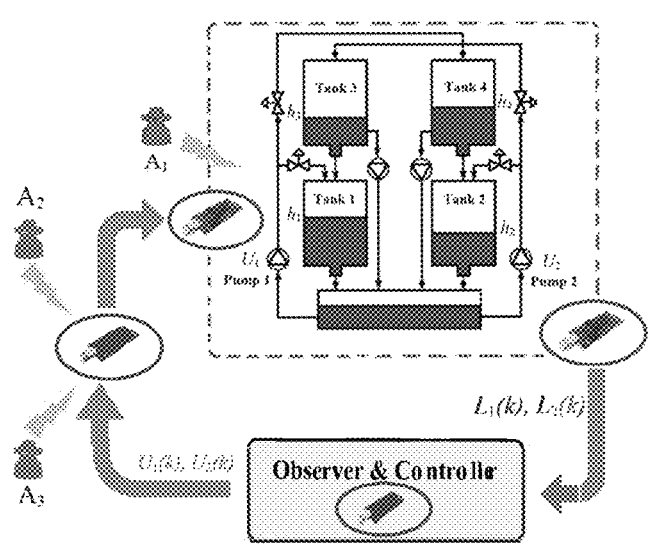
FIG. 3 is a diagram of an example fluid transfer cyber physical system and observer-based controller in accordance with some implementations.

The effectiveness of the observer-based controller and technique disclosed herein were demonstrated by considering a common CPS such as a quadruple-tank process controlled through a wireless communication network. As shown in FIG. 3, the example CPS consists of four tanks (two upper and two lower) where an objective is to control the level in the lower two tanks with two pumps. The process has two inputs (input voltages to the pumps) and two outputs (voltages from level measurement devices). The CPS model is similar to that described in other studies. (See, Johansson K H, *The quadruple-tank process: A multivariable laboratory process with an adjustable zero*, IEEE Transactions on control systems technology, 2000 May; 8(3):456-65, which is incorporated herein by reference).

$$h_1(t) = -\frac{a_1}{A_1}\sqrt{2gh_1(t)} + \frac{a_3}{A_1}\sqrt{2gh_3(t)} + \frac{\gamma_1 k_1}{A_1}U_1(t),$$

$$h_2(t) = -\frac{a_2}{A_2}\sqrt{2gh_2(t)} + \frac{a_4}{A_2}\sqrt{2gh_4(t)} + \frac{\gamma_2 k_2}{A_2}U_2(t),$$

$$h_3(t) = -\frac{a_3}{A_3}\sqrt{2gh_3(t)} + \frac{(1-\gamma_2)k_2}{A_3}U_2(t),$$

$$h_4(t) = -\frac{a_4}{A_4}\sqrt{2gh_4(t)} + \frac{(1-\gamma_1)k_1}{A_4}U_1(t),$$

$$L_1(t) = h_1(t), L_2(t) = h_2(t)$$

where hi is the water-level in tank i, Ai and ai are the cross-section area of the tanks and the outlet hole, respectively, ki are the pump constants, i are the flow ratios and g is the gravity acceleration. The system has two outputs L1(t) and L2(t) measuring the water-levels in tank 1 and 2, and two inputs, U1(t) and U2(t), corresponding to the voltages applied to electrical pumps that drive the flow of water into the tanks as shown in FIG. 3.

The system is linearized at a given equilibrium point ($h_i^0$, $u_i^0$, $y_i^0$). Defining the state, input, and output of the linearized system as $x_i(t) = h_i(t) - h_i^0$, $u_i(t) = U_i(t) - U_i^0$, and $y_i(t) = y_i(t) - L_i^0$, respectively, the linearized discrete time system is formulated as:

$$x(k+1) = Ax(k) + Bu(k), y(k) = Cx(k)$$

with $$A = \begin{bmatrix} -0.0159 & 0 & 0.0309 & 0 \\ 0 & -0.0110 & 0 & 0.0222 \\ 0 & 0 & -0.0309 & 0 \\ 0 & 0 & 0 & -0.0222 \end{bmatrix}$$

$$B = \begin{bmatrix} 0.0636 & 0 \\ 0 & 0.0488 \\ 0 & 0.0628 \\ 0.0456 & 0 \end{bmatrix}$$

$$C = \begin{bmatrix} 1 & 0 & 0 & 0 \\ 0 & 1 & 0 & 0 \end{bmatrix}$$

The process is controlled using an observer-based controller running in a remote computer and a wireless network is used for the communications. The communication network has four nodes, including a relay node, as illustrated in FIG. 3. The physical attack (A1) in which the adversary could directly perturb the dynamics of the systems such as the measurements of the levels in the tanks. In this example, the cyber attacks are performed through the relay node. The adversary may access and corrupt control signals (U1(k) and U2(k)) by blocking the arrival of the signal in the case of DoS attack (A2) or modifying the signal in the case of deception attack (A3).

Using a modeling tool (e.g., YALMIP in Matlab), the gains of the controller and estimator (5) and (6) can be obtained by applying Theorem 2 to be as follows:

$$K_1 = [\,-5.0810 \quad -0.7155 \quad 0.5520 \quad -4.3266\,] \quad (31)$$

$$K_2 = [\,-0.4143 \quad -3.9718 \quad -5.2888 \quad 0.5746\,]$$

$$L = \begin{bmatrix} 1.3862 & -0.0862 \\ -0.0375 & 1.6380 \\ -0.0486 & -0.4662 \\ -0.4410 & -0.0623 \end{bmatrix}$$

The system model was built using a modeling and simulation tool (e.g., Matlab/Simulink) in which the attack function is created with $\alpha(k)$, $\beta(k)$, and $\eta$ selected as Bernoulli distributed white sequences with probabilities as presented in FIG. 2.

Figure 4:
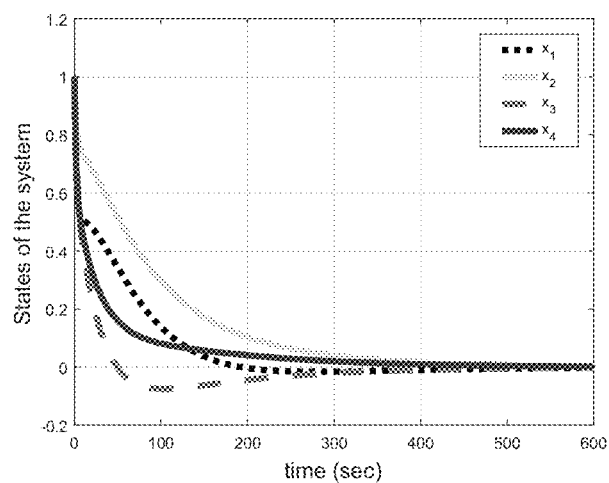
FIG. 4 is a graph showing system states of an example cyber physical system without attack in accordance with some implementations.

Example situations in the CPS were studied via simulation and states of the systems were obtained for each scenario (e.g., using MATLAB/Simulink) as follows:

1) States of an example CPS without attack are shown in FIG. 4.

Figure 5:
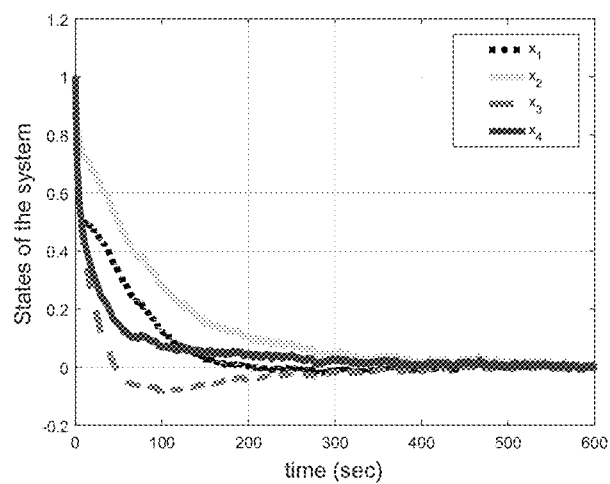
FIG. 5 is a graph showing system states of an example cyber physical system under simulated DoS and physical attacks in accordance with some implementations.

2) States of an example CPS under simulated DoS and physical attacks are shown in FIG. 5.

Figure 6:
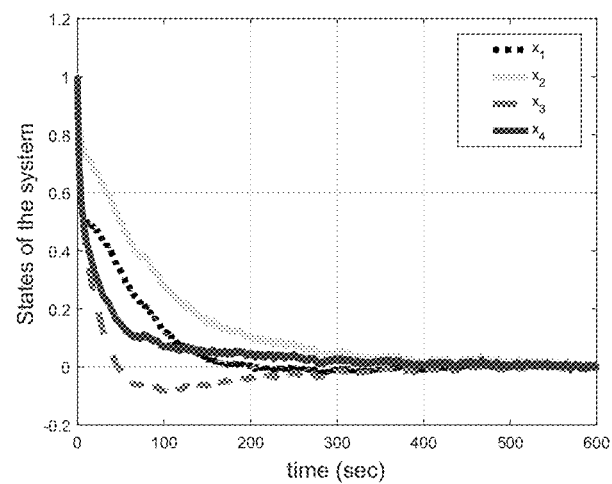
FIG. 6 is a graph showing system states of an example cyber physical system under simulated deception and physical attacks in accordance with some implementations.

3) States of an example CPS under simulated deception and physical attacks are shown in FIG. 6.

Figure 7:
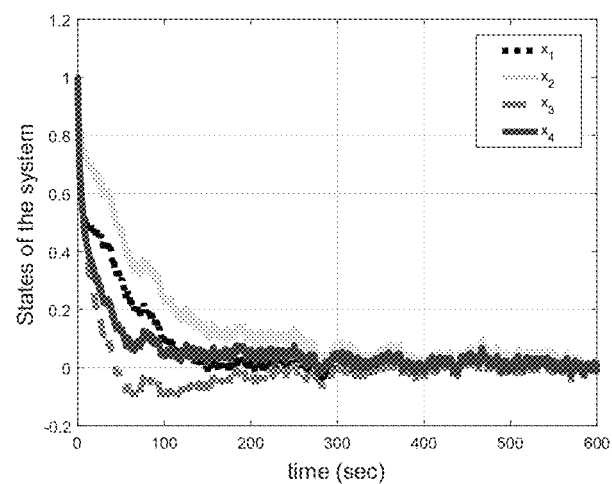
FIG. 7 is a graph showing system states of an example cyber physical system under simulated DoS, deception, and physical attacks in accordance with some implementations.

4) States of an example CPS under simulated DoS, deception, and physical attacks are shown in FIG. 7.

As shown in FIGS. 4-7, an implementation of the disclosed observer-based controller exhibited stability in the states under various attack scenarios.

Figure 8:
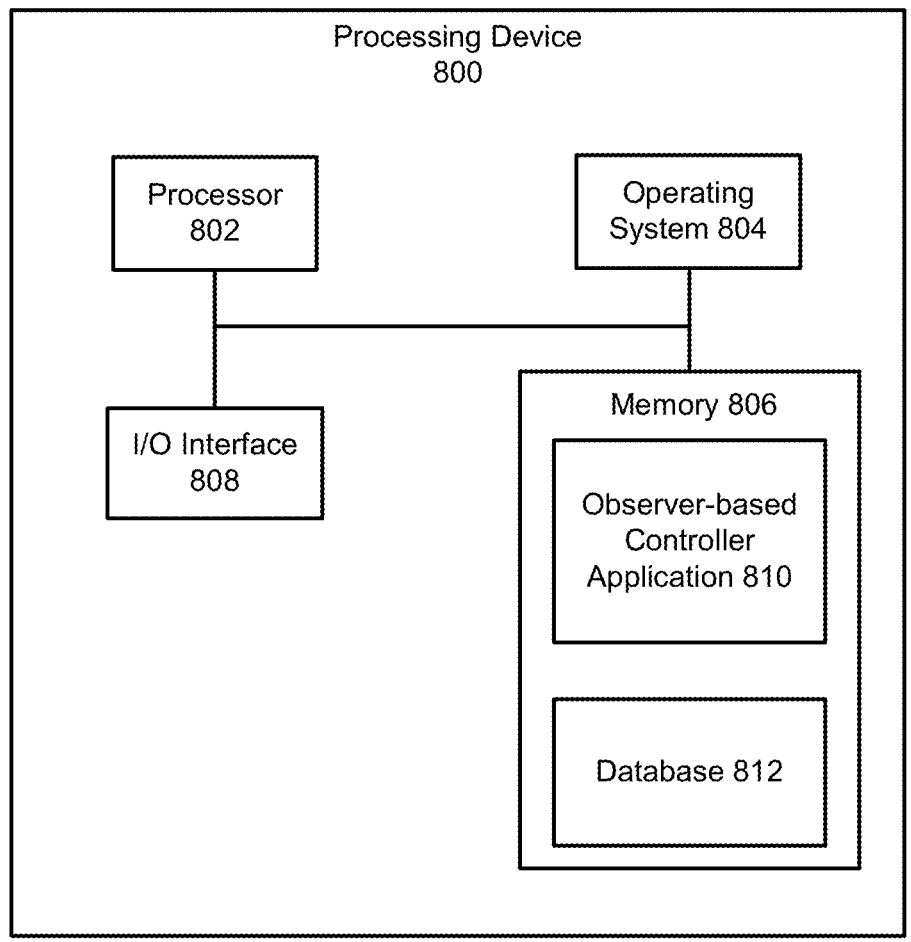
FIG. 8 is a diagram of an example processing system in accordance with some implementations.

FIG. 8 is a block diagram of an example processing device 800 which may be used to implement one or more features described herein. In one example, device 800 may be used to implement a computer device including an observer-based controller as described herein and perform appropriate method implementations described herein. Device 800 can be any suitable computer system, server, or other electronic or hardware device. For example, the device 800 can be programmable logic controller, a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, an operating system 804, a memory 806, and input/output (I/O) interface 808.

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 806 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 806 can store software operating on the device 800 by the processor 802, including an operating system 804, one or more observer-based control applications 810, and a database 812. In some implementations, applications 810 can include instructions that enable processor 802 to perform the functions described herein.

For example, application 810 can include observer-based controller functions as described herein. Any of software in memory 804 can alternatively be stored on any other suitable storage location or computer-readable medium. In addition, memory 804 (and/or other connected storage device(s)) can store machine learning model (e.g., SVM) information, and/or other instructions and data used in the features described herein. Memory 804 and any other type of storage (magnetic disk, optical disk, magnetic tape, or other tangible media) can be considered "storage" or "storage devices."

I/O interface 808 can provide functions to enable interfacing the processing device 800 with other systems and devices. For example, network communication devices, storage devices (e.g., memory and/or database), and input/output devices can communicate via interface 308. In some implementations, the I/O interface 808 can connect to interface devices including input devices (keyboard, pointing device, touchscreen, microphone, camera, scanner, etc.) and/or output devices (display device, speaker devices, printer, motor, etc.).

For ease of illustration, FIG. 8 shows one block for each of processor 802, memory 806, I/O interface 808, and software block 810. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein.

In general, a computer that performs the processes described herein can include one or more processors and a memory (e.g., a non-transitory computer readable medium). The process data and instructions may be stored in the memory. These processes and instructions may also be stored on a storage medium such as a hard drive (HDD) or portable storage medium or may be stored remotely. Note that each of the functions of the described embodiments may be implemented by one or more processors or processing circuits. A processing circuit can include a programmed processor, as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device.

The processor may contain one or more processors and even may be implemented using one or more heterogeneous processor systems. According to certain implementations, the instruction set architecture of the processor can use a reduced instruction set architecture, a complex instruction set architecture, a vector processor architecture, a very large instruction word architecture. Furthermore, the processor can be based on the Von Neumann model or the Harvard model. The processor can be a digital signal processor, an FPGA, an ASIC, a PLA, a PLD, or a CPLD. Further, the processor can be an x86 processor by Intel or by AMD; an ARM processor, a Power architecture processor by, e.g., IBM; a SPARC architecture processor by Sun Microsystems or by Oracle; or other known CPU architecture.

The functions and features described herein may also be executed by various distributed components of a system. For example, one or more processors may execute the functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

Moreover, the present disclosure is not limited to the specific circuit elements described herein, nor is the present disclosure limited to the specific sizing and classification of these elements. For example, the skilled artisan will appreciate that the systems described herein may be adapted based on the requirements of a contemplated control system.

Figure 9:
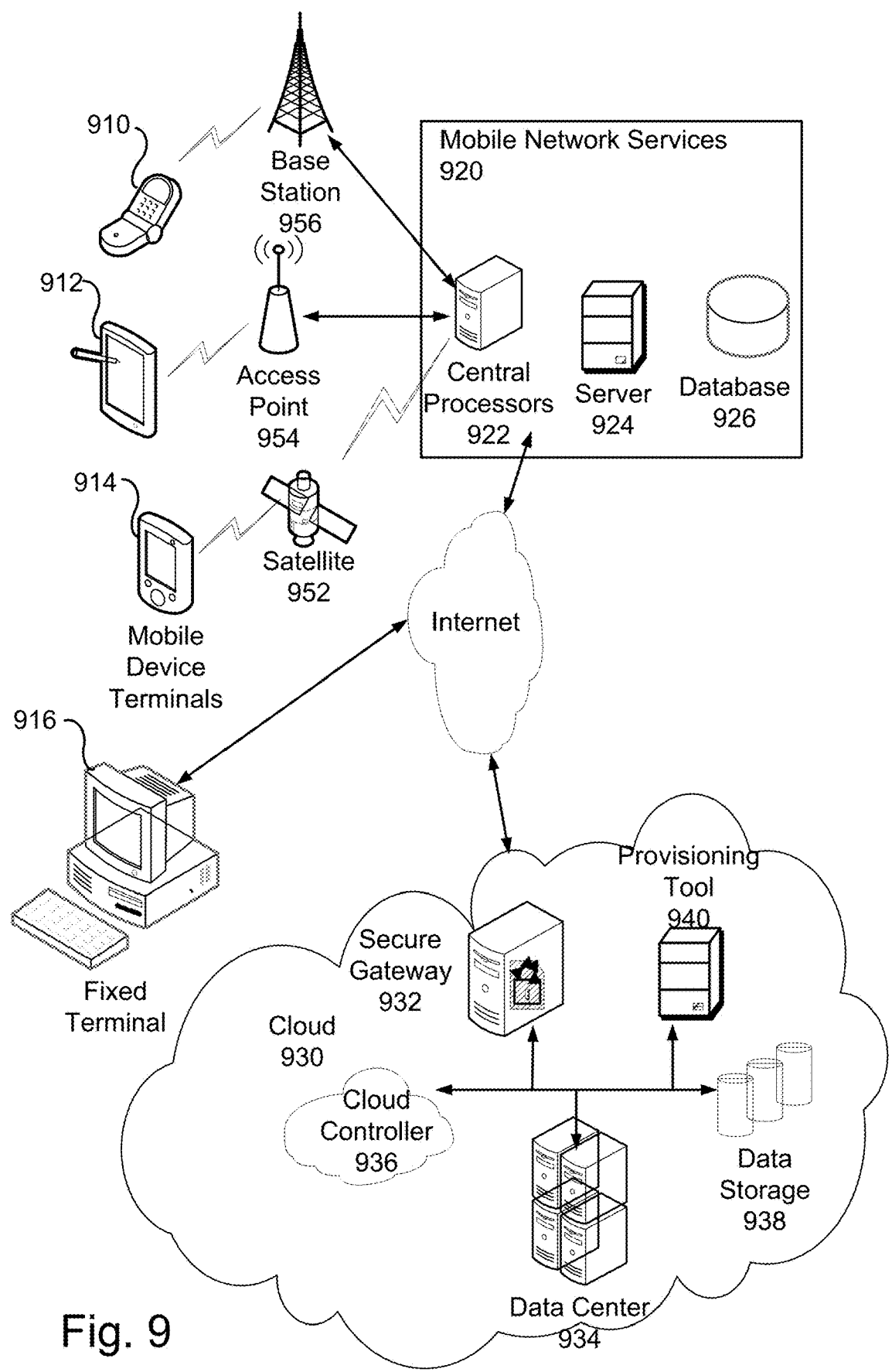
FIG. 9 is a diagram of an example network in accordance with some implementations.

The functions and features described herein may also be executed by various distributed components of a system. For example, one or more processors may execute these system functions, wherein the processors are distributed across multiple components communicating in a network. The distributed components may include one or more client and server machines, which may share processing, as shown in FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

The invention claimed is:

1. An observer-based controller to securely control a cyber physical system, the observer-based controller comprising:
a detector to determine an occurrence of an attack on the cyber physical system and to inform the observer-based controller via a signal, wherein the detector is at least one of a communications detector, a control signal detector, and a fluid level detector, and the detector comprises a signal emitter; and
an observer to estimate a system state of the cyber physical system based on at least partial information about the cyber physical system,
wherein the observer-based controller is configured to adjust an observer gain and a controller gain upon receiving the signal from the detector indicating the attack,
wherein the observer-based controller is configured to control the cyber physical system such that a physical attack signal is secured to be within a first threshold, a deception attack signal is secured to be within a second threshold, and an error of the estimated system state is secured to be within a third threshold,
wherein the cyber physical system comprises a communication network connecting the observer- based controller and one or more actuators;
wherein the first threshold, the second threshold and the third threshold are received as input from another system;
wherein the attack comprises a physical attack affecting the cyber physical system;
wherein the attack comprises one of a denial of service attack or a deception attack occurring in the communication network between the observer-based controller and the one or more actuators; and
wherein the communication network is a wireless communication network having a relay node, wherein the denial of service attack and the deception attack are performed through the relay node, and wherein the detector is configured to detect a missing or modified control signal at the relay node.

2. The observer-based controller of claim 1, wherein the observer estimates one or more next system states based on one or more of current system states, a current control signal and the error of the estimated system state of the cyber physical system.

3. The observer-based controller of claim 1, wherein the observer gain and the controller gain are determined based on the first threshold, the second threshold and the third threshold.

4. The observer-based controller of claim 1, wherein the first threshold, the second threshold and the third threshold are received as input from a user.

5. The observer-based controller of claim 1, the denial of service attack is represented as a probability distribution.

6. The observer-based controller of claim 1, wherein the cyber physical system is a fluid transfer system, wherein the physical attack comprises perturbing measurements of one or more fluid levels in the fluid transfer system, wherein the denial of service attack comprises blocking arrival of one or more control signals to corresponding fluid actuators, wherein the deception attack comprises modifying one or more control signals controlling the corresponding fluid actuators, and wherein the controller adjusts the observer gain and the controller gain to respective values determined based on the first, second and third thresholds upon detection of the attack.

7. A method to control a cyber physical system, the method comprising:
- detecting, via a detector, an occurrence of an attack on the cyber physical system;
- informing an observer-based controller of the attack via a signal from the detector;
- estimating, using an observer, a system state of the cyber physical system based on at least partial information about the cyber physical system;
- adjusting, using the observer-based controller, an observer gain and a controller gain upon receiving the signal from the detector indicating the attack; and
- controlling, using the observer-based controller, the cyber physical system such that a physical attack signal is secured to be within a first threshold, a deception attack signal is secured to be within a second threshold, and an error of the estimated system state is secured to be within a third threshold,
- wherein the cyber physical system is a fluid transfer system, wherein detecting the occurrence of the attack comprises detecting a physical attack, a denial of service attack, or a deception attack, wherein the physical attack comprises perturbing measurements of one or more fluid levels in the fluid transfer system, wherein the denial of service attack comprises blocking arrival of one or more control signals to corresponding fluid actuators, wherein the deception attack comprises modifying one or more control signals controlling the corresponding fluid actuators, and wherein the observer-based controller adjusts the observer gain and the controller gain to respective values determined based on the first, second and third thresholds upon detection of the attack.

8. The method of claim 7, further comprising estimating, using the observer, one or more next system states based on one or more of current system states, a current control signal and the error of the estimated system state of the cyber physical system.

9. The method of claim 7, wherein the observer gain and the controller gain are determined based on the first threshold, the second threshold and the third threshold.

10. The method of claim 7, further comprising receiving the first threshold, the second threshold and the third threshold as input from a user.

* * * * *